United States Patent
Grannersberger (12)

(10) Patent No.: US 6,391,167 B1
(45) Date of Patent: May 21, 2002

(54) WATER CHLORINATOR

(75) Inventor: Ingo W. Grannersberger, Johannesburg (ZA)

(73) Assignee: Integrated Pool Products (Proprietary) Limited, Gauteng (ZA)

(*) Notice: Subject to any disclaimer, the term of this patent is extended or adjusted under 35 U.S.C. 154(b) by 0 days.

(21) Appl. No.: 09/456,252

(22) Filed: Dec. 7, 1999

(30) Foreign Application Priority Data

Dec. 7, 1998 (ZA) .............................................. 98/11149

(51) Int. Cl.[7] .............................................. B25B 15/00
(52) U.S. Cl. .................... 204/228.3; 204/229.6; 204/229.7; 204/230.2; 204/230.5; 204/230.8; 204/272; 204/275.1; 204/278.5
(58) Field of Search .................... 204/228.1, 228.2, 204/229.2, 229.4, 229.6, 229.7, 229.8, 230.2, 230.5, 230.8, 232, 237, 247.2, 272, 275.1, 278.5

(56) References Cited

U.S. PATENT DOCUMENTS

| | | | | |
|---|---|---|---|---|
| 5,062,940 A | * | 11/1991 | Davies ..................... | 204/228.1 |
| 5,254,226 A | * | 10/1993 | Williams et al. ......... | 204/275.1 |
| 5,364,512 A | * | 11/1994 | Earl ........................... | 204/272 |

* cited by examiner

*Primary Examiner*—Bruce F. Bell
(74) *Attorney, Agent, or Firm*—Howrey Simon Arnold & White, LLP

(57) ABSTRACT

A water chlorinator comprises a housing having in-line inlet and outlet openings and a removable cover. The cover supports two electrode terminals which are spaced apart and have corresponding rods extending therefrom through concentric anode and cathode discs. Alternate discs are electrically connected to each rod. The power supply is a DC supply which includes an input bridge connected to a buck convertor and an output relay arranged to switch the output from the convertor to the electrodes of the chlorinator.

10 Claims, 2 Drawing Sheets

WATER CHLORINATOR

FIELD OF THE INVENTION

This invention relates to a chlorinator for treating water and, more particularly but not exclusively, swimming pool water.

BACKGROUND TO THE INVENTION

Salt chlorinators for keeping swimming pool water clear and hygienic have been proposed over a long period of time. These chlorinators work to the extent that they do satisfactorily treat the water, but they have serious drawbacks. Essentially they have but very limited lifespan without maintenance and are thus both inconvenient and expensive to maintain in full working order.

OBJECT OF THE INVENTION

It is the object of this invention to provide a chlorinator which is safe and which will at least mitigate the disadvantages referred to above.

SUMMARY OF THE INVENTION

According to this invention there is provided a water chlorinator comprising a housing having in line inlet and outlet openings and a removable cover supporting electrode terminals, the terminal being spaced apart and having rods extending therefrom through concentric anode and cathode discs with alternate discs electrically connected to each rod.

Further features of this invention provide for the rods to be threaded, for the discs to be held in fixed spaced relationship on the rods by nuts and spacers and for the nuts and spacers to be of circular cross section.

The invention also provides for the anode and cathode disc to have holes therethrough spaced apart the distance between the electrodes, one hole being sized to receive a rod therethrough and the other being sized to permit passage of a spacer with a clearance gap.

A further aspect of this invention provides for the housing cover to include an inwardly facing recess housing a flow sensor.

The invention also provides for the anodes and cathodes discs to be of the same or different materials.

A still further aspect of this invention provides for the chlorinator to have a DC power supply, for the DC power supply to include an input bridge connected to a buck converter, and an output relay arranged to switch the output of the buck converter to the electrodes of the chlorinator, for the buck converter to include a FET output stage, for the buck converter to be synchronously driven by a switch mode controller, and for the switch mode controller to operate at a frequency of about 70 KHz.

There is also provided for the power supply to include means for regulating the voltage and the current applied to the electrodes of the chlorinator, and for the current regulation to include current limiting.

There is still further provided for the power supply to include a switching facility for selectively reversing the polarity of the voltage applied to the cell, at periodic intervals.

BRIEF DESCRIPTION OF THE DRAWINGS

These and other features of this invention will become apparent from the following description of a preferred embodiment of a swimming pool chlorinator wherein reference is made to the accompanying drawings in which.

DETAILED DESCRIPTION OF THE INVENTION

Figure 1:
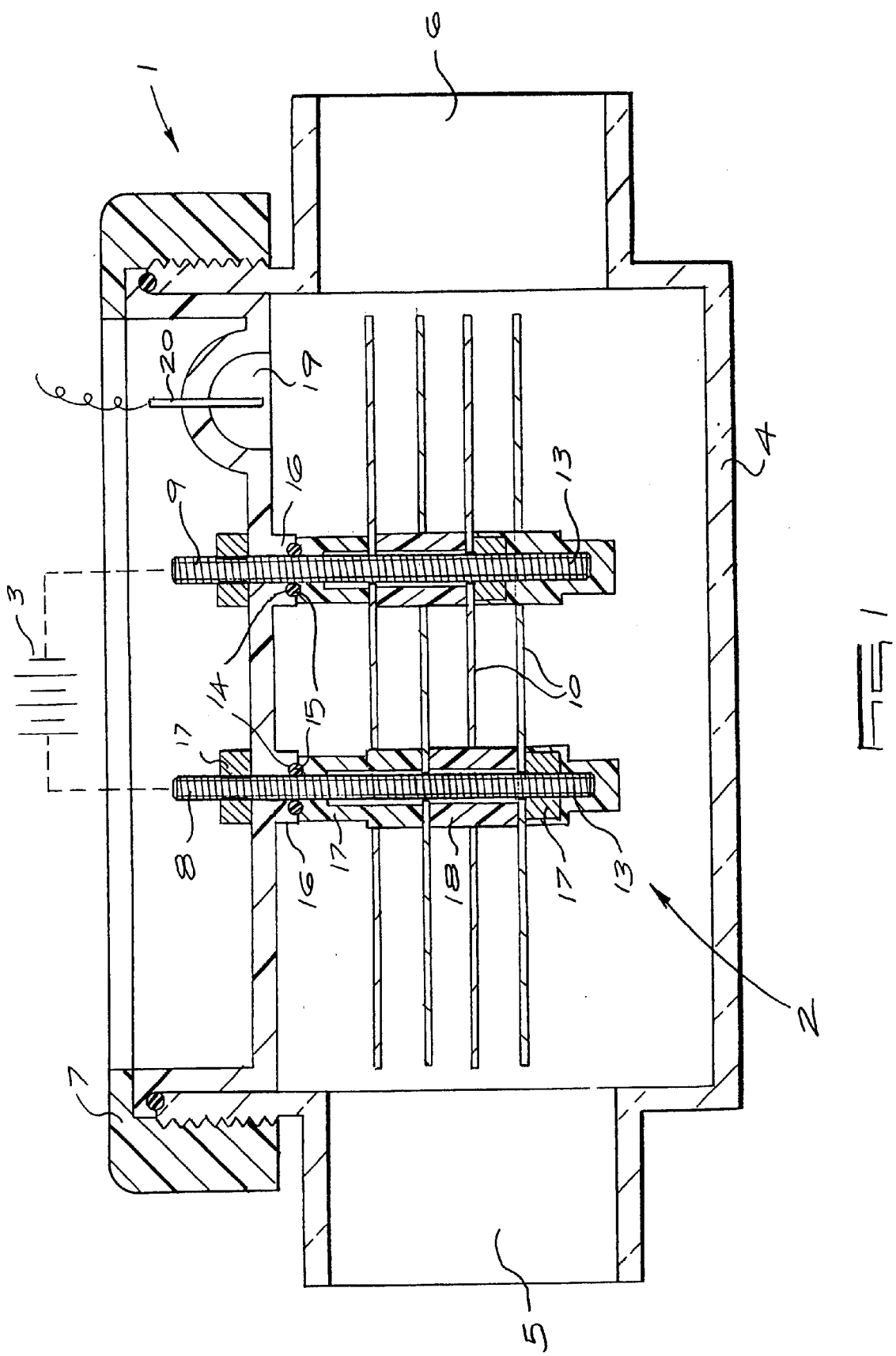
FIG. 1 shows a longitudinal section through a chlorinator.

As illustrated a swimming pool chlorinator (1) comprises an electrolytic cell (2) with a DC power supply (3).

The cell (2) is, in use, connected in series with the pool filter return flow so that filtered water will pass through the cell before re-entering the pool. The water in the pool must have a suitable salt content in order for the electrolysis to take place to release sufficient chlorine into the flowing water to provide adequate purification.

The cell (2) consists of a housing (4) having an inlet (5) and outlet (6) in line. The inlet and outlet have means for connecting the chlorinator into the return flow line from the swimming pool filter to the pool.

The chlorinator (1) can thus be located remote from the pool and no special protection of the electrical supply to the chlorinator need be made.

The housing (4) has an access opening at right angles to the inlet and outlet with a screwthreaded cover (7). The cover (7) supports a pair of terminals (8) and (9) and these terminals are rigidly connected to separate series of electrodes forming the anode and cathode plates for the cell (2).

Figure 2:
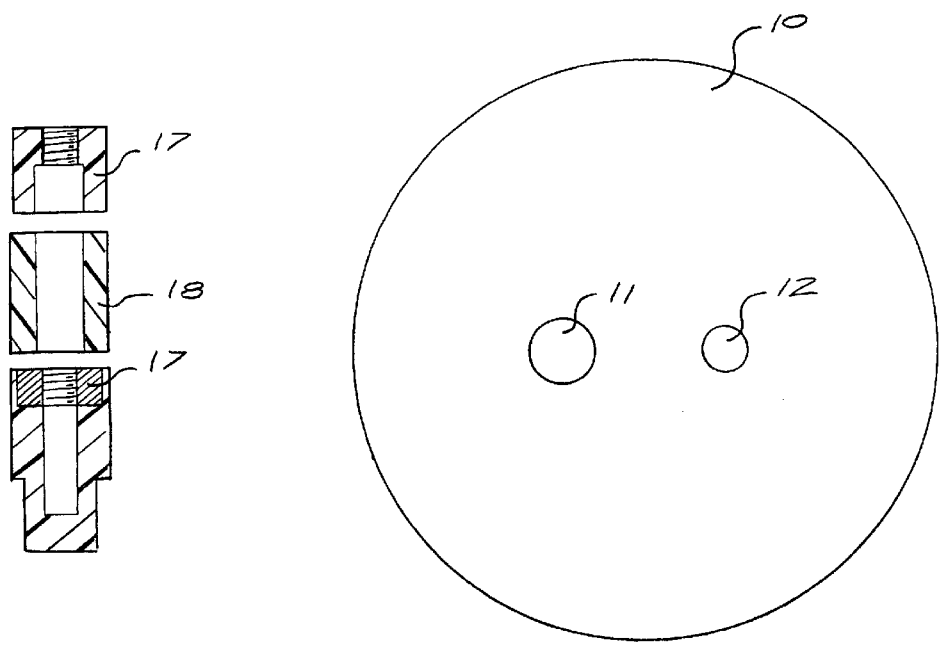
FIG. 2 shows details of the electrode mountings.

Referring to FIG. 2 it will be seen that the electrodes are formed as identically sized circular discs (10). The discs (10) are made so that they may be introduced into the housing through the access opening and while attached to the cover (7).

The discs (10) are also each provided with identically sized and located apertures (11) and (12). The apertures have the same centre distance as the terminals (8) and (9). The discs (10) are of rigid metal and can have a thickness of about 1 mm.

The terminals (8) and (9) are provided by the ends of screwthreaded rods (13) and each rod has an annular groove (14) in which is located an O-ring seal (15). The rods (13) pass through hollow bosses (16) provided on the cover (7).

The housing (4) and cover (7) are made of suitable plastics material which is non-conductive.

Mounting of the rods (13) in the cover (7) and the discs (10) on the rods is effected by means of threaded nuts (17) and spacers (18) of circular cross-section. While this requires special tools to secure and release the nuts on the rods it provides external surfaces which may be exposed to the electrolyte in use which are not readily attacked and corroded. These surfaces also provide an optimum shape to receive an insulating sleeve further reducing the damage liable to be caused through corrosion.

The terminals (8) and (9) are mounted to the cover (7) by nuts which place the O-ring seal (15) under compression to render the sealing around the rods (13) complete.

The discs (10) are threaded onto the rods (13) and clamped thereon with each alternate disc (10) clamped to one rod and the other discs clamped to the other rod. This is made possible by the sizes of the apertures (11) and (12). The large apertures are chosen to ensure that they are located over spacers with a clearance which is sufficient to allow an insulating sleeve to be positioned on the relevant spacer.

It will be appreciated that the above construction makes for simple manufacture of the discs (10) and of assembly of the cell (2).

The material of the discs (10) can be the same when the energised surface is a ruthenium coating, preferably on a titanium substrate. Where a cheaper construction is required, such a coated disc may be interspersed between stainless or mild steel discs (10). The use of discs of the same material makes it possible to use a reversal of the polarity of the DC power to the discs to have a self cleaning effect and increase the life of the cell before any maintenance is required.

In use chlorine is generated and ionised on the surface of the anodes where it is dissolved directly into the water passing through the cell (2).

Operation of the cell (2) will preferably not be controlled through the pump motor, but rather by a flow sensor (20) determining whether or not water is flowing through the chlorinator (1).

Within the cover (7) a recess is provided which provides a gas trap (19). Mounted within the gas trap (19) is a flow sensor (20). This provides for reliable flow sensing and a quick response to changes, thus avoiding dangerous build up of hydrogen conditions in the cell.

The sensor (20) is a pin extending into the gas trap (19) where, under normal flow conditions, a circuit will be completed through the pin and the electrolyte to provide a predetermined potential which is constantly monitored.

Where no flow of water takes place the energised cell (2) will generate hydrogen which will drive the water from the upper part of the housing and initially from the gas trap (19). This breaks contact between the pin and water with a resultant change in the potential monitored.

As soon as this situation is reached the chlorine generation in the cell (2) is shut down. This shut down is however controlled so that the cell will have a predetermined period of after-run to generate hydrogen to remove scale from the electrodes.

Figure 3:
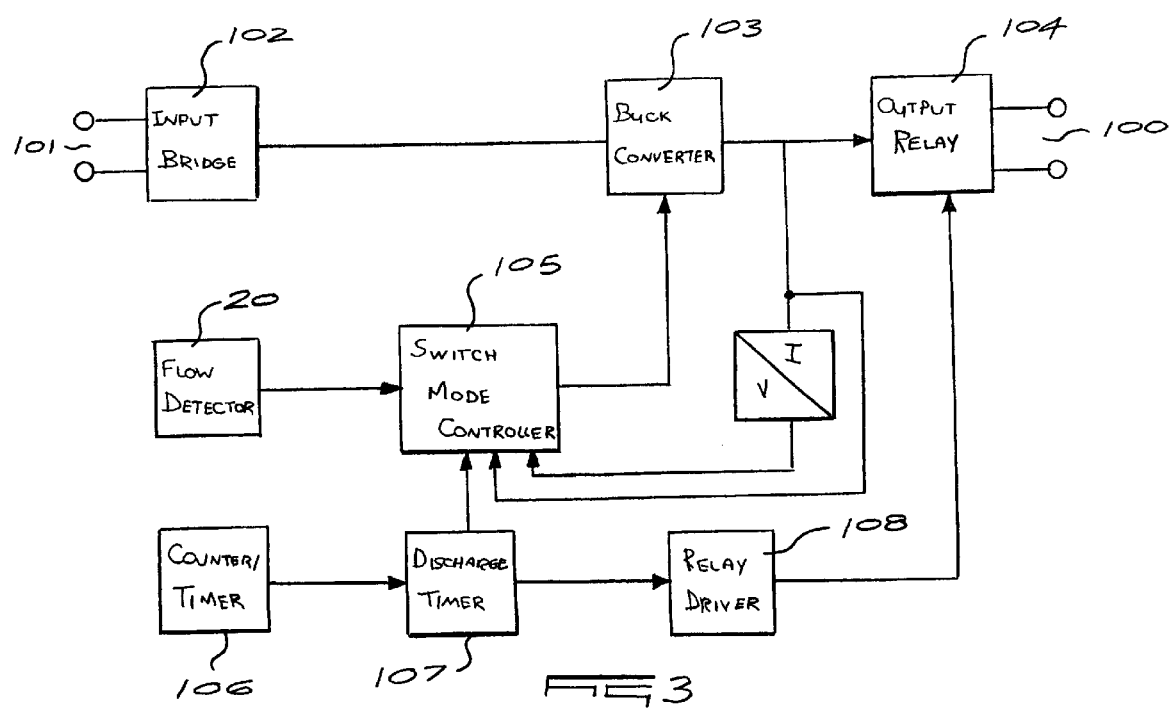
FIG. 3 is a functional block diagram of a power supply of the chlorinator of FIG. 1.

Turning now to FIG. 3, the DC power supply (3) provides a 12 volt DC supply (100) to the cell (2). Conveniently, where a swimming pool includes an underwater light, an input voltage (101) for the power supply (3) can be derived from the transformer provided to give a low voltage necessary for such a light.

Provision will be made to ensure that only one of either chlorinator (1) or the light is connected to power at any one time. This enables the chlorinator to form part of original equipment for swimming pool filtration plants or to be easily connected into existing plants. The input voltage (101), when not derived from the pool light transformer, includes special protective devices to ensure safe and efficient operation.

The power supply (3) includes an input bridge (102) in the form of a self-commutating field effect transistor (FET) half bridge rectifier providing an output of about 17 volts DC. The output of the input bridge is applied to a buck converter (103) whose output is, in turn, applied to the cell (2) through an output relay (104). The buck converter (103) includes a FET bridge output stage and is synchronously driven by a switch mode controller (105) operating at approximately 70 KHz. The switch mode controller (105) is, preferably, based on an LT 1339 switching voltage regulator integrated circuit which is well known in the art.

The input bridge (102) is designed to provide overvoltage and surge protection, as well as low-loss input rectification and thus low heat generation.

The current and voltage of the output of the buck converter (103) are fed back to the switch mode controller (105) to provide for regulation of both the current and the voltage, respectively, applied to the cell (2). In use, this gives the chlorinator (1) a salt overload immunity and improved chlorine output stability. The current regulation of the power supply (3) also includes a current limiting function to prevent damage to the cell (2) under short circuit conditions.

The output of the flow sensor (20) is connected to the switch mode controller to shut down the power supply (3) when no-flow condition is detected.

The power supply (3) includes a dual function timer circuit. One of the timer functions (106) is directed at timing the length of time that the cell (2) is desired to be in operation, while the second timer function (107) is used to control the polarity of the output voltage applied to the cell (2). In particular, the second, or discharge timer function is connected to the switch mode controller (105), and to the output relay through a relay driver (108), and is programmed to provide for a 90 second polarity reversal cycle, comprising a 30 second cell discharge phase, a 30 second polarity changeover phase, and a 30 second recharge phase.

Where use is made of anode and cathode discs of different materials, the reversal of the polarity of the voltage applied to the discs is unnecessary and the second timer function is disabled by a suitable setting on the power supply (3).

The invention provides a water chlorinator in which the power supply is accurately controlled to ensure protection of the cell components while obtaining efficient chlorine gas production.

What I claim as new and desire to secure by Letters Patent is:

1. A water chlorinator comprising a housing having inlet and outlet openings in line, an access opening into the housing at right angles to the inlet and outlet and fitted with a removable cover which supports electrode terminals, the terminals being spaced apart and having rods extending therefrom, concentric anode and cathode discs supported on the rods with alternate discs electrically connected to each rod.

2. A water chlorinator as claimed in claim 1 wherein the rods are screwthreaded and the discs held in fixed spaced relationship on the rods by means of nuts and spacers of circular transverse cross-section.

3. A water chlorinator as claimed in claim 2 wherein the anode and cathode discs have holes therethrough spaced apart the distance between the electrodes, one hole being sized to receive a rod therethrough and the other being sized to permit passage of a spacer with a clearance gap.

4. A water chlorinator as claimed in claim 1 wherein the anode and cathode discs are made from different materials.

5. A water chlorinator as claimed in claim 1 wherein the housing cover includes an inwardly facing recess housing a flow sensor.

6. A water chlorinator as claimed in claim 1 wherein the chlorinator includes a DC power supply which has an input bridge connected to a buck converter, and an output relay arranged to switch the output of the buck converter to the electrodes of the chlorinator.

7. A water chlorinator as claimed in claim 6 wherein the buck converter includes a FET output stage and is synchronously driven by a switch mode controller.

8. A water chlorinator as claimed in claim 7 wherein the switch mode controller operates at a frequency of about 70 KHz.

9. A water chlorinator as claimed in claim 6 wherein means for regulating the voltage and the current applied to the electrodes of the chlorinator are included and the current regulation means is current limiting.

10. A water chlorinator as claimed in claim 6 in which the power supply includes a switching facility for selectively reversing the polarity of the voltage applied to the cell, at periodic intervals.

* * * * *